United States Patent
Clark et al.

(10) Patent No.: US 6,242,528 B1
(45) Date of Patent: Jun. 5, 2001

(54) ACRYLIC MODIFIED WATERBORNE ALKYD DISPERSIONS

(75) Inventors: Mark D. Clark; Bradley J. Helmer, both of Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/133,485

(22) Filed: Aug. 12, 1998

Related U.S. Application Data

(60) Provisional application No. 60/055,140, filed on Aug. 12, 1997.

(51) Int. Cl.$^7$ .................................................. C08J 31/00
(52) U.S. Cl. ........................ 524/560; 524/561; 524/562
(58) Field of Search ................................... 524/560, 561, 524/562

(56) References Cited

U.S. PATENT DOCUMENTS

| | | | |
|---|---|---|---|
| 3,345,313 | 10/1967 | Ruhf et al. | 260/22 |
| 3,734,874 | 5/1973 | Kibler et al. | 260/29.2 |
| 3,778,395 | 12/1973 | Huelsman et al. | 260/22 |
| 3,894,978 | 7/1975 | Montesissa et al. | 260/23 |
| 3,979,346 | 9/1976 | Zuckert et al. | 260/23 |
| 4,011,388 | 3/1977 | Murphy et al. | 526/320 |
| 4,026,850 | 5/1977 | Frank et al. | 260/22 TN |
| 4,116,902 | 9/1978 | Harris et al. | 260/22 TN |
| 4,178,425 | 12/1979 | Emmons et al. | 528/73 |
| 4,180,645 | 12/1979 | Emmons et al. | 528/73 |
| 4,222,911 | 9/1980 | Christenson et al. | 266/22 TN |
| 4,293,471 | 10/1981 | Heiberger | 260/22 CB |
| 4,299,742 | 11/1981 | Belder et al. | 260/22 EP |
| 4,301,048 | 11/1981 | Hirayama et al. | 260/22 CQ |
| 4,333,864 | 6/1982 | Zückert | 525/501.5 |
| 4,413,073 | 11/1983 | Gibson et al. | 523/511 |
| 4,414,357 | 11/1983 | Wright et al. | 524/513 |
| 4,451,596 | 5/1984 | Wilk et al. | 523/501 |
| 4,497,933 | 2/1985 | Gorzinski et al. | 524/604 |
| 4,504,609 | 3/1985 | Kuwajima et al. | 523/501 |
| 4,698,391 | 10/1987 | Yacobucci et al. | 525/162 |
| 4,737,551 | 4/1988 | Dervan et al. | 525/440 |
| 5,011,883 | 4/1991 | Aksman | 524/513 |
| 5,102,925 | 4/1992 | Suzuki et al. | 523/500 |
| 5,296,530 | 3/1994 | Bors et al. | 524/558 |
| 5,349,026 | 9/1994 | Emmons et al. | 525/328.6 |
| 5,371,148 | 12/1994 | Taylor et al. | 525/293 |
| 5,378,757 | 1/1995 | Blount, Jr. et al. | 524/608 |
| 5,422,392 | 6/1995 | Floyd et al. | 524/457 |
| 5,494,975 | 2/1996 | Lavoie et al. | 525/928.6 |
| 5,525,662 | 6/1996 | Lavoie et al. | 524/558 |
| 5,530,059 | 6/1996 | Blount, Jr. et al. | 524/604 |
| 5,538,760 | 7/1996 | Sharma | 427/388.4 |
| 5,539,073 | 7/1996 | Taylor et al. | 526/323 |
| 5,559,192 | 9/1996 | Bors et al. | 525/300 |
| 5,569,715 | 10/1996 | Grandhee | 525/7 |
| 5,686,518 | 11/1997 | Fontenot et al. | 524/458 |

FOREIGN PATENT DOCUMENTS

| | | |
|---|---|---|
| 0 457 276 A1 | 11/1991 | (EP) . |
| 0 555 903 | 8/1993 | (EP) . |
| 92/01734 | 2/1992 | (WO) . |
| 95/02019 | 1/1995 | (WO) . |

OTHER PUBLICATIONS

Wang et al., "Emulsion and Miniemulsion Copolymerization of Acrylic Monomers in the Presence of Alkyd Resin," *Journal of Applied Polymer Science*, vol. 60, pp. 2069–2076 (1996).

Wicks et al., *Organic Coatings: Science and Technology*, vol. I: Film Formation, Components, and Appearance, eds. John Wiley & Sonsw, Inc., pp. 200–201 (1992).

Solomon, *The Chemistry of Organic Film Formers*, eds. John Wiley & Sons, Inc., pp. 212–218 and p. 330 (1967).

Database WPI 91–143961, Week 9120, "Photocurable compositions for coating agent, inks, etc.—contain polyester(s) and acetoacetyl gp.–contg. (meth)acyrlate(s)," (1991).

*Primary Examiner*—Peter D. Mulcahy
(74) *Attorney, Agent, or Firm*—Rose M. Allen, Esq.; Harry J. Gwinnell

(57) ABSTRACT

A water-based latex of an acrylic-modified waterborne alkyd dispersion in water is described. The acrylic-modified waterborne alkyd is a hybrid resin prepared by the polymerization of at least one latent oxidatively-functional (LOF) acrylic monomer in the presence of a waterborne alkyd. Preparation of the latexes may be achieved by emulsion polymerization of at least one latent oxidatively-functional acrylic monomer in the presence of a waterborne alkyd whereby the latent oxidative functionality of the acrylic polymer survives polymerization. Such acrylic-modified waterborne alkyds are useful in a variety of coating compositions.

19 Claims, No Drawings

ACRYLIC MODIFIED WATERBORNE ALKYD DISPERSIONS

This application claims priority of copending provisional application No. 60/055,140 filed on Aug. 12, 1997, which is incorporated herein by reference.

BACKGROUND OF THE INVENTION

1. Field of the Invention

The invention relates to a water-based latex of an acrylic modified waterborne alkyd dispersion in water. Such acrylic modified waterborne alkyds are useful in a variety of coating compositions.

2. Description of Related Art

In recent years, considerable effort has been expended by the coatings industry to develop low or zero VOC containing coating formulations. Regulations to limit the amount of VOC content of industrial coatings have encouraged research and development to explore new technologies directed at reducing solvent emissions from industrial solvent-based coatings operations such as automotive, appliance, general metal, furniture, and the like. One technology involves the replacement of organic solvents with water and is of particular interest for the obvious reasons of availability, cost, and environmental acceptability. However, while the move from organic solvent-based compositions to aqueous compositions brings health and safety benefits, aqueous coating compositions must meet or exceed the performance standards expected from solvent-based compositions. The need to meet or exceed such performance standards places a premium on the characteristics and properties of waterborne polymer dispersions used in aqueous coating compositions.

Waterborne polymer dispersions have been prepared from each of the three primary industrial film-forming polymer types: polyesters, acrylics and alkyds. Of the three polymer types, waterborne alkyd resins exhibit significantly higher storage stability and coating stability than the waterborne polyester or acrylic resins. In addition, alkyd resins, due to their low molecular weight, exhibit exceptional film forming ability which translates into very high gloss in the final coating film. Resistance properties are developed, as with traditional solvent-borne alkyds, via autooxidative crosslinking of the alkyd film. However, while alkyd polymers have shown, and continue to show promise, they have relatively slow "dry" and/or cure times, particularly at ambient temperatures. In an attempt to address such concerns, hybrids of waterborne alkyds and relatively high molecular weight acrylic polymers have received considerable attention.

U.S. Pat. No. 4,413,073 describes the preparation of an aqueous dispersion of particles of a film-forming polymer comprising a pre-formed polymer and at least one polymer formed in situ ("multi-polymer particles"). The dispersion is prepared in the presence of an amphipathic stabilizing compound having an HLB of at least 8 and whose lipophilic portion comprises at least one ethylenic unsaturation. The aqueous dispersion is useful as a film-forming component of coating compositions.

U.S. Pat. No. 4,451,596 describes water-dilutable alkyd and acrylate resins for use in water-dilutable lacquer systems. A method for the preparation of water-dilutable resin preparations based upon alkyd and acrylate resins is also described.

European Patent Application 0 555 903 describes a water-dispersible hybrid polymer of an unsaturated fatty acid-functionalized polyester. In addition, aqueous dispersions of such a hybrid polymer for use in aqueous coating compositions with a high solids content and films produced by using such coating compositions are described.

PCT Application WO 95/02019 describes an emulsion of an air-drying resin dispersed in water and the preparation of such emulsions. Hybrid emulsions of an alkyd resin and an acrylate resin are also described.

The acrylic polymers of previous hybrids are either non-reactive or possess reactive groups (e.g. hydroxyl groups) which react, as do similar groups present in the alkyd resin, with aminoplasts such as melamine formaldehyde resins and only at elevated temperatures.

SUMMARY OF THE INVENTION

One aspect of the invention is a water-based latex of an acrylic-modified waterborne alkyd resin. The acrylic-modified waterborne alkyd resin is a hybrid resin resulting from the polymerization of at least one latent oxidatively-functional (LOF) acrylic monomer in the presence of a waterborne alkyd such that the resulting hybrid resin has latent oxidative functionality. The invention also provides a method for preparing such water-based latexes by polymerizing a hybrid resin resulting from the polymerization of at least one LOF acrylic monomer in the presence of a waterborne alkyd such that the resulting hybrid polymer has latent oxidative functionality. The invention further provides coating compositions containing the water-based latexes of the invention.

DETAILED DESCRIPTION OF THE INVENTION

The invention provides a water-based latex of an acrylic-modified waterborne alkyd resin. In one embodiment, the latex affords a stable, emulsion of a hybrid resin resulting from the polymerization of at least one latent oxidatively-functional (LOF) acrylic monomer in the presence of a waterborne alkyd such that the acrylic monomer retains a sufficient amount of LOF groups for further reaction with other LOF groups or alkyd functionality after or upon film formation. Latexes of the invention are stable when stored at temperatures at or moderately above room temperature. The latex of the invention is capable of affecting crosslinking upon film formation. Such latex films or coatings may be cured at ambient temperature, thermally or photochemically.

In the water-based latexes of the invention, the acrylic-modified waterborne alkyd resin generally exists as particles dispersed in water. The particles are generally spherical in shape. The particles may be structured or unstructured. Structured particles include, but are not limited to, core/shell particles and gradient particles. The core/shell polymer particles may also be prepared in a multilobe form, a peanut shell, an acorn form, or a raspberry form. It is further preferred in such particles that the core portion comprises about 20 to about 80 wt % of the total weight of said particle and the shell portion comprises about 80 to about 20 wt % of the total weight of the particle.

The average particle size of the hybrid latex may range from about 25 to about 500 nm. Preferred particle sizes range from about 50 to about 300 nm, more preferably from about 100 to 250 nm. The hybrid latex particles generally have a spherical shape.

The glass transition temperature ($T_g$) of the acrylic portion of the hybrid resin in accordance with the invention, may be up to about 100° C. In a preferred embodiment of the invention, where film formation of the latex at ambient temperatures is desirable, that glass transition temperature may preferably be under about 70° C., and most preferably between about 0–60° C.

The acrylic-modified waterborne alkyd resins of the invention are prepared by polymerization of at least one latent oxidatively-functional (LOF) acrylic monomer in the presence of a waterborne alkyd such that sufficient latent oxidative functionality of the acrylic monomer survives the polymerization process. Any polymerization process known in the art may be used. The polymerization may take place as a single stage or multi-stage feed. If a multi-stage feed is used, one or more stages may contain an LOF acrylic monomer. Different LOF monomers may be used in different stages. Copolymers may be used as the acrylic portion of the modified alkyd and may be prepared by copolymerizing other ethylenically unsaturated monomers with the LOF acrylic monomer. Preferably an emulsion polymerization process is used since emulsion polymerization allows the preparation of high molecular weight polymers at low viscosity. The preparation of emulsion polymers of acrylic-modified waterborne alkyd resins containing latent oxidative functionality is one possible solution for a coating composition which crosslinks under a variety of cure conditions, e.g. ambient, thermal, and photochemical.

Waterborne Alkyd Resin

A waterborne alkyd resin for use in the water-based latex of the invention may be any waterborne alkyd resin known in the art, including any water-dissipatible, water-dispersible, or water-reducible (i.e. able to get into water) alkyd resin with the proviso that the waterborne alkyd does not contain a pendant sulfonate group to impart water-dissipatibility, water-dispersibility, or water-reducibility. Waterborne alkyds useful in the invention are, for example, those having other groups to impart water-dissipatibility, water-dispersibility, or water-reducibility. Such groups include, but are not limited to, pendant carboxylic acid groups as well as salts or anhydrides thereof, pendant polyethylene glycol groups and other pendant hydrophilic groups. The waterborne alkyd may also be dissipated, dispersed, or reduced into water using cosurfactants as known in the art. Examples of such alkyd resins are described in U.S. Pat. Nos. 3,979,346, 3,894,978, 4,299,742, 4,301,048, and 4,497,933, all of which are incorporated herein by reference.

Generally waterborne alkyd resins may be prepared by reacting a monobasic fatty acid, fatty ester or naturally occurring-partially saponified oil; a glycol or polyol; and a polycarboxylic acid.

The monobasic fatty acid, fatty ester, or naturally occurring-partially saponified oil is preferably selected from the formulae (I), (II), and (III):

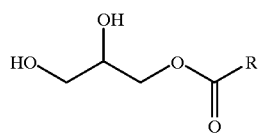

(I)

(II)

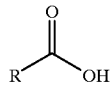

(III)

where the R group is a $C_8$–$C_{20}$ alkyl group. More preferably, the R group is one of the following:

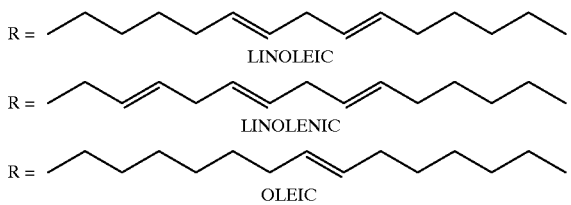

The monobasic fatty acid, fatty ester or naturally occurring-partially saponified oil is preferably prepared by reacting a fatty acid or oil with a polyol. Examples of suitable oils include, but are not limited to, sunflower oil, canola oil, dehydrated castor oil, coconut oil, corn oil, cottonseed oil, fish oil, linseed oil, oiticica oil, soya oil, and tung oil, animal grease, castor oil, lard, palm kernel oil, peanut oil, perilla oil, safflower oil, tallow oil, walnut oil, and the like. Suitable examples of fatty acids alone or as components of oil include, but are not limited to, tallow acid, soya acid, myristic acid, linseed acid, crotonic acid, versatic acid, coconut acid, tall oil fatty acid, rosin acid, neodecanoic acid, neopentanoic acid, isostearic acid, 12-hydroxystearic acid, cottonseed acid, and the like.

The glycol or polyol is preferably selected from aliphatic, alicyclic, and aryl alkyl glycols. Suitable examples of glycols include, but are not limited to, ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl- 1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexanedimethanol, 1,4-cyclohexanedimethanol, 2,2,4-trimethyl-1,3-pentanediol, 2,2,4-tetramethyl-1,3-cyclobutanediol, p-xylenediol, hydroxypivalyl hydroxypivalate, 1,10-decanediol, hydrogenated bisphenol A, trimethylolpropane, trimethylolethane, pentaerythritol, erythritol, threitol, dipentaerythritol, sorbitol, glycerine, trimellitic anhydride, pyromellitic dianhydride, dimethylolpropiconic acid, and the like.

The polycarboxylic acid is preferably selected from the group consisting of isophthalic acid, terephthalic acid, phthalic anhydride(acid), adipic acid, tetrachlorophthalic anhydride, tetrahydrophthalic anhydride, dodecanedioic acid, sebacic acid, azelaic acid, 1,4-cyclohexanedicarboxylic acid, 1,3-cyclohexanedicarboxylic acid, maleic anhydride, fumaric acid, succinic anhydride (acid), 2,6-naphthalenedicarboxylic acid, glutaric acid and esters thereof.

In addition to the amount of polyol reacted with the fatty acid, fatty ester or naturally occurring-partially saponified oil according to the preferred step, an additional amount of a polyol or other branching agent such as a polycarboxylic acid may be used to increase the molecular weight and branching of the waterborne alkyd resin. These branching agents are preferably selected from trimethylolethane, pentaerytlritol, erythritol, threitol, dipentaetritol, sorbitol, glycerine, trimellitic anhydride, pyromellitic dianhydride, dimethylolpropionic acid, and trimethylolpropane.

In order for the alkyd resin to serve as a reactive filming aid (via oxidative coupling) in a hybrid latex and become incorporated into the crosslinked polymer film, it is preferred that the alkyd have some finite oil length—long, medium or short. The finite oil length or oil content is generally between about 20 wt % and about 90 wt % in the alkyd composition based on the total weight of the alkyd resin. A "long" oil alkyd has an oil length or oil content of about 60–90 wt % based on the total weight of the alkyd resin. A "medium" oil alkyd has an oil content of about 40–60 wt % based on the total weight of the alkyd resin. A "short" oil alkyd has an oil length or oil content of about 20–40 wt % based on the total weight of the alkyd resin.

Latent Oxidatively-Functional (LOF) Acrylic Monomer

A latent oxidatively-functional (LOF) acrylic monomer to be polymerized in the presence of a waterborne alkyd in order to form the water-based latex of the invention may be any acrylic monomer with at least one latent oxidatively-functional (LOF) group. The LOF group may be any pendant moiety which is capable of (i) surviving the polymerization process and (ii) participating in or promoting oxidative crosslinking of the modified alkyd. After polymerization of the LOF acrylic monomer, a modified alkyd of the invention possesses sufficient LOF groups to increase or amplify the degree of crosslinking normally found in alkyd resins. In other words, sufficient LOF groups remain to increase the effective crosslinking of the alkyd.

The presence of a LOF group on the modified alkyd makes crosslinking possible upon or after film formation. With a modified alkyd of the invention, crosslinking may occur between LOF groups of acrylic monomer(s), between a LOF group of an acrylic monomer and a ethylenically unsaturated functionality of the alkyd, or between ethylenically unsaturated functionalities of the alkyd. Capable of undergoing an oxidative reaction, the LOF group participates in or promotes oxidative crosslinking as a source of free radicals to generate a free-radical flux. Preferably the LOF group is an ethylenic unsaturation such as, but not limited to, allyl and vinyl groups. The LOF group may also preferably be an acetoacetyl moiety or enamine moiety. Preparation of enamines from acetoacetyl groups are described in U.S. Pat. Nos. 5,296,530, 5,494,975, and 5,525,662 which are incorporated here by reference.

Examples of acrylic monomers having latent oxidatively-functional (LOF) groups include, but are not limited to, allyl methacrylate, vinyl methacrylate, acetoacetoxyethyl methacrylate, hydroxybutenyl methacrylate, the allyl or diallyl ester of maleic acid, poly(allyl glycidyl ether) and the like.

The acrylic portion of the modified alkyd may be a homopolymer or a copolymer. The LOF acrylic monomer, upon polymerization in the presence of a waterborne alkyd, may be added alone, as a mixture of LOF acrylic monomers, or as a mixture of a LOF acrylic monomer and one or more ethylenically unsaturated co-monomers. Examples of suitable ethylenically unsaturated co-monomers include, but are not limited to, styrenic monomers such as styrene, α-methyl styrene, vinyl naphthalene, vinyl toluene, chloromethyl styrene and the like; ethylenically unsaturated species such as, for example, methyl acrylate, acrylic acid, methacrylic acid, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate, octyl acrylate, octyl methacrylate, glycidyl methacrylate, carbodiimide methacrylate, alkyl crotonates, vinyl acetate, di-n-butyl maleate, di-octylmaleate, and the like; and nitrogen containing monomers including t-butylaminoethyl methacrylate, dimethylaminoethyl methacrylate, diethylaminoethyl methacrylate, N,N-dimethylaminopropyl methacrylaniide, 2-t-butylaminoethyl methacrylate, N,N-dimethylaminoethyl acrylate, N-(2-methacryloyloxy-ethyl) ethylene urea, and methacrylamidoethylethylene urea. Preferably, the LOF acrylic monomer is added as a mixture of at least one LOF acrylic monomer and an ethylenically unsaturated co-monomer. More preferably, the ethylenically unsaturated co-monomer is a styrenic monomer.

Water-based Latexes

A water-based latex of the invention is prepared by the polymerizing at least one latent oxidatively-functional (LOF) acrylic monomer in the presence of an aqueous dispersion of a waterborne alkyd. A water-based latex of the invention is stable at the same pHs as latexes prepared from traditional waterborne alkyds. However, unlike hybrid latexes of traditional waterborne alkyds, the waterborne alkyd based hybrid latexes of the invention are stable at pH ≦7. In the water-based latex of the invention, the modified alkyd generally exists as particles in water. As discussed above, sufficient LOF groups remain to allow oxidative crosslinking of films formed from the resulting water-based alkyd latex. Since the LOF group functions to increase the effective crosslinking of the alkyd, post-polymerization survival of sufficient LOF groups not only allows for their coreactivity with other LOF groups and/or waterborne alkyd functionality upon or after film formation but may also promote similar oxidative crosslinking between waterborne alkyd functionalities. As a result of such coreactivity between LOF groups and/or alkyd functionalities, better film properties are achieved.

As discussed above, the LOF acrylic monomer may be added either as a mixture of at least one LOF acrylic monomer or as a mixture of at least one LOF acrylic monomer and an ethylenically unsaturated co-monomer. Addition of the LOF acrylic monomer is conducted in a one-stage or multiple-stage (e.g. core-shell) process. Preferably, the LOF acrylic monomer is added in a one-stage process. By adding the LOF acrylic monomer or monomers in a one-stage process, a homogeneous acrylic polymer (i.e., simple terpolymer) is produced which contains a sufficient number of LOF groups (e.g. allyl, vinyl) capable of reacting with other LOF groups or alkyd functionality upon or after film formation or promoting reaction between functionalities on the alkyd. Addition of the LOF acrylic monomer in a multiple-stage process produces a heterogeneous acrylic polymer. For example, in a two-stage process, the first stage of the addition may produce a core polymer of preferably an acrylic or styrene/acrylic polymer which is often pre-crosslinked with a multi-functional monomer such as trimethylolpropane triacrylate. The second stage of the addition produces a shell polymer of preferably a styrene/acrylic polymer which contains a high level of LOF groups, such as reactive allyl and/or vinyl moieties. Monomers for use in such one- or multiple-stage polymerization processes are described in U.S. Pat. No. 5,539,073 incorporated here by reference. The LOF groups may be located at the termini of polymer as well as along the polymer backbone.

As discussed above, preferably the water-based latex of the invention is prepared under emulsion polymerization conditions. In general, upon emulsion polymerization of the LOF acrylic polymer compositions, it is primarily the ethylenic unsaturation moiety of the acrylic that undergoes polymerization and not the LOF group. If the LOF group participates in the polymerization, polymerization conditions are such that enough LOF groups survive in order to oxidatively crosslink with other LOF groups and/or waterborne alkyd functionality and/or to promote oxidative crosslinking between waterborne alkyd functionalities upon or after film formation. Survival of LOF groups, such as allyl or vinyl moieties, upon polymerization can be achieved by manipulating the differences in reactivity of the ethylenically unsaturated groups. For example, the ethylenically unsaturated acrylic moiety of an allyl or vinyl functionalized acrylic monomer has greater reactivity upon polymerization with styrenic monomers than the LOF allyl or vinyl moiety. As a result, the resulting polymer contains LOF groups. A description of manipulation of allyl functionalized acrylic polymer compositions to promote survival of the allyl moiety upon emulsion polymerization may be found in U.S. Pat. No. 5,539,073, which is incorporated herein by reference. Vinyl functionalized acrylic polymer compositions may be manipulated in a manner similar to that applied to allyl functionalized acrylic polymer compositions.

When the LOF group of the acrylic polymer is an acetoacetoxy moiety, under emulsion polymerization conditions it is the ethylenically unsaturated moiety which polymerizes. The acetoacetoxy moiety is uneffected by, and thus survives, the polymerization process.

The polymerization process by which the hybrid latexes are made may also require an initiator, a reducing agent, or a catalyst. Suitable initiators include conventional initiators such as ammonium persulfate, ammonium carbonate, hydrogen peroxide, t-butylhydroperoxide, ammonium or alkali sulfate, di-benzoyl peroxide, lauryl peroxide, di-tertiarybutylperoxide, 2,2'-azobisisobuteronitrile, benzoyl peroxide, and the like.

Suitable reducing agents are those which increase the rate of polymerization and include, for example, sodium bisulfite, sodium hydrosulfite, sodium formaldehyde sulfoxylate, ascorbic acid, isoascorbic acid, and mixtures thereof.

Suitable catalysts are those compounds which promote decomposition of the polymerization initiator under the polymerization reaction conditions thereby increasing the rate of polymerization. Suitable catalysts include transition metal compounds and driers. Examples of such catalysts include, but are not limited to, ferrous sulfate heptahydrate, ferrous chloride, cupric sulfate, cupric chloride, cobalt acetate, cobaltous sulfate, and mixtures thereof.

Optionally, a conventional surfactant or a combination of surfactants may be used as a costabilizer or cosurfactant, such as an anionic or non-ionic emulsifier, in the suspension or emulsion polymerization preparation of a hybrid latex of the invention. Examples of preferred surfactants include, but are not limited to, alkali or ammonium alkylsulfate, alkylsulfonic acid, or fatty acid, oxyethylated alkylphenol, or any combination of anionic or non-ionic surfactant. A more preferred surfactant monomer is HITENOL HS-20 (which is a polyoxyethylene alkylphenyl ether ammonium sulfate available from DKS International, Inc. of Japan). A list of suitable surfactants is available in the treatise: McCutcheon's Emulsifiers & Detergents, North American Edition and International Edition, MC Publishing Co., Glen Rock, N.J., 1993. Preferably a conventional surfactant or combination of surfactants is used when the alkyd portion of the hybrid resin represents up to about 35 wt %, generally about 5–20 wt % of the total solids of the latex.

If the resulting hybrid latex is formulated with drier salts typically used in alkyd coatings and LOF moieties are present in the acrylic portion of the hybrid, significant improvements in, among other properties, latex gel fraction and swell ratio (LGF and LSR, respectively) are observed. While the alkyd portion of the hybrid latex plays an important role in both stabilizing the latex and improving film formation, it is the presence of the LOF acrylic portion of the hybrid that allows for better physical and mechanical film properties. The improved properties are related to greater crosslink density than that observed for hybrid resins containing non-LOF acrylics.

In general, the alkyd portion of the hybrid latex represents about 5–60 wt %, preferably about 10–50 wt %, more preferably about 20–40 wt % of the total solids of the latex while the acrylic portion of the hybrid latex represents about 30–90 wt %, preferably about 50–80 wt %, more preferably about 60–80 wt % of the total solids of the latex. Such hybrid latexes can be further used in coating compositions.

A coating composition of the invention contains a latex of an acrylic-modified waterborne alkyd dispersion of the invention and may be prepared by techniques known in the art, e.g. as disclosed in U.S. Pat. Nos. 4,698,391, 4,737,551, and 3,345,313, each of which is incorporated herein by reference in their entirety. Examples of such coating compositions include, for example, architectural coatings, maintenance coatings, industrial coatings, automotive coatings, textile coatings, inks, adhesives, and coatings for paper, wood, and plastics. Coating compositions of the invention contain significantly less solvent, less than 25 wt % to as low as 1 wt % and even zero VOC content. The waterborne alkyd portion of the hybrid resin retains the desirable properties of an alkyd while the LOF acrylic portion of the resin compliments or enhances the oxidative crosslinking ability of the hybrid alkyd resin at ambient temperature. The coating compositions of the invention produce coatings that have high gloss, fast cure, and good acid and caustic resistance.

The coating composition may be coated onto a substrate and cured using techniques known in the art (e.g. by spray-applying 3 to 4 mils of wet coating onto a metal panel, and heating in a 150° C. forced air oven for 30 minutes). The substrate can be any common substrate such as paper, polyester films such as polyethylene and polypropylene, metals such as aluminum and steel, glass, urethane elastomers and primed (painted) substrates, and the like. The coating composition of the invention may be cured at room temperature (ambient cure), at elevated temperatures (thermal cure), or photochemically cured.

A coating composition of the invention may further contain coating additives. Examples of such coating additives include, but are not limited to, one or more leveling, rheology, and flow control agents such as silicones, fluorocarbons or cellulosics; extenders; reactive coalescing aids such as those described in U.S. Pat. No. 5,349,026, incorporated herein by reference; plasticizers; flatting agents; pigment wetting and dispersing agents and surfactants; ultraviolet (UV) absorbers; UV light stabilizers; tinting pigments; colorants; defoaming and antifoaming agents; anti-settling, anti-sag and bodying agents; anti-skinning agents; anti-flooding and anti-floating agents; biocides, fungicides and mildewcides; corrosion inhibitors; thickening agents; or coalescing agents. Specific examples of such additives can be found in Raw Materials Index, published by the National Paint & Coatings Association, 1500 Rhode Island Avenue, N.W., Washington, D.C. 20005. Further examples of such additives and emulsion polymerization methodology may be found in U.S. Pat. No. 5,371,148, incorporated herein by reference.

Examples of flatting agents include, but are not limited to, synthetic silica, available from the Davison Chemical Division of W. R. Grace & Company under the SYLOID® tradename; polypropylene, available from Hercules Inc. under the HERCOFLAT® tradename; and synthetic silicate, available from J. M. Huber Corporation under the ZEOLEX® tradename.

Examples of dispersing agents and surfactants include, but are not limited to, sodium bis(tridecyl) sulfosuccinnate, di(2-ethylhexyl) sodium sulfosuccinnate, sodium dihexylsulfosuccinnate, sodium dicyclohexyl sulfosuccinnate, diamyl sodium sulfosuccinnate, sodium diisobutyl sulfosuccinnate, disodium iso-decyl sulfosuccinnate, disodium ethoxylated alcohol half ester of sulfosuccinnic acid, disodium alkyl amido polyethoxy sulfosuccinnate, tetra-sodium N-(1,2-dicarboxyethyl)-N-octadecyl sulfosuccinnamate, disodium N-octasulfosuccinnamate, sulfated ethoxylated nonylphenol, 2-amino-2-methyl-1-propanol, and the like.

Examples of viscosity, suspension, and flow control agents include, but are not limited to, polyaminoamide phosphate, high molecular weight carboxylic acid salts of polyamine amides, and alkylene amine salts of an unsaturated fatty acid, all available from BYK Chemie U.S.A. under the ANTI TERRA tradename. Further examples include polysiloxane copolymers, polyacrylate solution, cellulose esters, hydroxyethyl cellulose, hydrophobically-modified hydroxyethyl cellulose, hydroxypropyl cellulose, polyamide wax, polyolefin wax, carboxymethyl cellulose, ammonium polyacrylate, sodium polyacrylate, hydroxypropyl methyl cellulose, ethyl hydroxyethyl cellulose, polyethylene oxide, guar gum and the like. Other examples of thickeners include the methylene/ethylene oxide associative thickeners and water soluble carboxylated thickeners such as, for example, UCAR POLYPHOBE® by Union Carbide.

Several proprietary antifoaming agents are commercially available and include, for example, BUBREAK® of Buckman Laboratories Inc., BYK® of BYK Chemie, U.S.A., FOAMASTER® and NOPCO® of Henkel Corp./Coating Chemicals, DREWPLUS ® of the Drew Industrial Division of Ashland Chemical Company, TRYSOL® and TROYKYD® of Troy Chemical Corporation, and SAG® of Union Carbide Corporation.

Examples of fungicides, mildewcides, and biocides include, but are not limited to, 4,4-dimethyloxazolidine, 3,4,4-trimethyloxazolidine, modified barium metaborate, potassium N-hydroxy-methyl-N-methyldithiocarbamate, 2-(thiocyano-methylthio)benzothiazole, potassium dimethyl dithiocarbamate, adamantane, N-(trichloromethylthio) phthalimide, 2,4,5,6-tetrachloro-isophthalonitrile, orthophenyl phenol, 2,4,5-trichlorophenol, dehydroacetic acid, copper naphthenate, copper octoate, organic arsenic, tributyl tin oxide, zinc naphthenate, and copper 8-quinolinate.

Examples of U.V. absorbers and U.V. light stabilizers include among others substituted benzophenone, substituted benzotriazoles, hindered amines, and hindered benzoates, available from American Cyanamid Company under the CYASORB UV tradename, and diethyl-3-acetyl-4-hydroxy-benzyl-phosphonate, 4-dodecyloxy-2-hydroxy benzophenone, and resorcinol monobenzoate.

Examples of solvents and coalescing agents are well known and include but are not limited to ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol mono-isobutyrate, ethylene glycol mono-octyl ether, diacetone alcohol, TEXANOL® ester alcohol (Eastman Chemical Company), and the like. Such solvents and coalescing aids may also include reactive solvents and coalescing aids such as diallyl phthalate, SANTOLINK XI-100® polyglycidyl allyl ether from Monsanto, and others as described in U.S. Pat. Nos. 5,349,026 and 5,371,148, incorporated herein by reference.

Pigments suitable for use in the coating compositions envisioned by the invention are the typical organic and inorganic pigments, well-known to one of ordinary skill in the art of surface coatings, especially those set forth by the Colour Index, 3d Ed., 2d Rev., 1982, published by the Society of Dyers and Colourists in association with the American Association of Textile Chemists and Colorists. Examples include, but are not limited to, the following: titanium dioxide, barytes, clay, or calcium carbonate, CI Pigment White 6 (titanium dioxide); CI Pigment Red 101 (red iron oxide); CI Pigment Yellow 42; CI Pigment Blue 15, 15:1, 15:2, 15:3, 15:4 (copper phthalocyanines); CI Pigment Red 49:1; and CI Pigment Red 57:1. Colorants such as phthalocyanine blue, molybdate orange, or carbon black are also suitable for the coating compositions of the invention.

The following examples are given to illustrate the invention. It should be understood, however, that the invention is not to be limited to the specific conditions or details described in these examples.

The examples of various coating compositions of the invention use the following materials not described above:

COBALT HYDROCURE II drier, sold by OMG, Cleveland, Ohio

DOWFAX 2A1 surfactant from Dow Chemical, Midland, Mich.

KELSOL 3960-B2G-75, 3922-G-80, 3964-B2G-70, and 3904-BG4-75 water reducible alkyds sold by Reichhold Chemical, Research Triangle Park, N.C.

TERGITOL 15-S-40 surfactant sold by Union Carbide Chemical and Plastics Co., Danbury, Conn.

TEXANOL ester-alcohol coalescent sold by Eastman Chemical Company, Kingsport, Tenn.

The following methods were used to evaluate the coatings and films prepared according to the invention.

Film Gel Fraction/Swell Ratio

Film swell ratios (FSR) were obtained by determining the ratio of insoluble polymer weight fraction swollen in acetone (by weight) to dry weight of the insoluble weight fraction in a dry film sample.

The procedure used is as follows: for each sample determination, a 4×"4" 325-mesh steel screen and a metal weighing boat are baked in the oven, cooled for 30 minutes and weighed (W1 and W2, respectively). After the latex film is dried and kept for the required number of days at room temperature, a piece of the film is cut, weighed (W3), placed in an aluminum pan, and put aside. Another film sample is cut, weighed (W4) and placed in a screw cap jar with excess solvent on a shaker bath for 16 hours at constant temperature. The film gel is recovered by pouring the solution plus wet solids through the screen and weighing the screen plus retained wet solids (W5). At this point the screen plus solids and the film sample are dried in the aluminum boat in a vacuum oven at 80° C. to constant weight and the weight for the screen plus dry solids (W6) and the film sample in the aluminum boat (W7) obtained. Calculations are shown below.

$$FGF = (W6-W1)/[W4*((W7-W2)/W3)]$$

$$FSR = (W5-W1)/(W6-W1)$$

EXAMPLES 1–8

Preparation of KELSOL Alkyd/acrylic Hybrids

A series of alkyd/acrylic hybrids was prepared using the KELSOL dispersible alkyd resins shown in Table 1. The hybrids differ in LOF level, alkyd level, and alkyd type.

A general procedure for the preparation of these materials is as follows: To a 500 ml reactor, appropriate amounts of demineralized water and alkyd were added, along with sufficient ammonium hydroxide to adjust to pH 8.0. These reactor contents were heated to 82° C. at which time 2.06 g Dowfax 2A1 (sodium dodecyl diphenyloxide disulfonate available from Dow Chemical) and 0.93 g ammonium persulfate in 22 g water was added to the reactor over 240 minutes. Simultaneously, 176 g of the monomer mixture shown in Table 18 was added over 225 minutes. At the end of the 225 minutes, 9 g of methyl methacrylate was added over 15 minutes. After completion of the additions, the reactor was held at 82° C. for one hour, then cooled to room temperature. Finally, 0.2 g of tert-butyl hydroperoxide in 2.75 g water and 0.2 g of sodium formaldehyde sulfoxylate in 2.75 g water were added to the latex with mixing. The latex was then filtered through a 100 mesh wire screen. The particle size, pH, and percent solids of the resulting hybrid latexes are shown in Table 2.

TABLE 1

KELSOL dispersible alkyd resins

| KELSOL Alkyd | Percent Solids | Acid Number |
|---|---|---|
| 3922-G-80 | 80 | 52–58 |
| 3960-B2G-75 | 75 | 37–41 |
| 3964-B2G-70 | 70 | 38–42 |
| 3904-BG4-75 | 75 | 38–42 |

TABLE 2

| Latex | KELSOL Alkyd Type | Wt % Alkyd[1] | Monomer Mixture Ratio MMA/BA/AAEM[2] | Particle Size (nm) | pH | Tg (° C.) | Scrap (gm) | Percent Solids |
|---|---|---|---|---|---|---|---|---|
| 1 | 3922-G-80 | 9.1 | 60/40 | 60 | 6.0 | 27 | 14.5 | 47.1 |
| 2 | 3922-G-80 | 9.1 | 55/35/10 | 68 | 5.4 | 37 | 2.3 | 44.8 |
| 3 | 3922-G-80 | 9.1 | 50/30/20 | 82 | 5.5 | 38 | 5.9 | 47.0 |
| 4 | 3922-G-80 | 16.7 | 55/35/10 | 48 | 6.0 | 31 | 1.4 | 44.9 |
| 5 | 3922-G-80 | 23.1 | 55/35/10 | 41 | 6.2 | 29 | 2.9 | 44.9 |
| 6 | 3960-B2G-75 | 9.1 | 55/35/10 | 92 | 5.7 | — | 22.1 | 44.9 |
| 7 | 3964-B2G-70 | 9.1 | 55/35/10 | 78 | 5.5 | — | 4.6 | 44.9 |
| 8 | 3904-BG4-75 | 9.1 | 55/35/10 | 85 | 5.7 | — | 4.8 | 45.1 |

[1]Wt % based on total polymer solids.
[2]MMA—methyl methacrylate;
BA—butyl acrylate;
AAEM—acetoacetoxyethyl methacrylate.

EXAMPLE 9

Film Gel Fractions and Film Swell Ratios of Examples 1–8

For each latex of Examples 1–8, to 50 g latex was added 0.32 g of 28% ammonium hydroxide, 2.7 g of a 25% aqueous solution of TERGITOL 15-S-40, 1.1 g of TEXANOL, and 0.45 g of Cobalt HYDROCURE II. Films were cast and air dried at room temperature for one week. Film gel fractions (FGF) and film swell ratios (FSR) were determined as above, except using tetrahydrofuran (THF) as the solvent instead of acetone. The results are summarized in Table 3.

Example 1 as the non-functional control had a much higher FSR and a much lower FGF than the systems containing AAEM as the LOF. Example 3 which had the highest level of LOF had the lowest FSR and the highest FGF.

TABLE 3

Film Swell Ratios and Film Gel Fractions of Examples 1–8

| Latex Example | Film Swell Ratio | Film Gel Fractions |
|---|---|---|
| 1 | 33.9 | 0.36 |
| 2 | 8.7 | 0.80 |
| 3 | 3.9 | 0.89 |
| 4 | 6.6 | 0.81 |
| 5 | 6.3 | 0.82 |
| 6 | 17.1 | 0.57 |
| 7 | 15.3 | 0.62 |
| 8 | 9.2 | 0.76 |

The claimed invention is:

1. A latent oxidatively-functional-modified alkyd comprising the product of at least one latent oxidatively-functional monomer polymerized in the presence of a waterborne alkyd with the proviso that said waterborne alkyd does not contain a pendant sulfonate group, wherein the resulting latent oxidatively-functional-modified alkyd possesses sufficient available latent oxidatively-functional groups to increase the effective oxidative crosslinking of said latent oxidatively-functional-modified alkyd upon application to a substrate.

2. A latent oxidatively-functional-modified alkyd of claim 1, wherein said latent oxidatively-functional group is selected from the group consisting of allyl, vinyl, acetoacetyl, and enamine.

3. A latent oxidatively-functional-modified alkyd of claim 1, wherein said latent oxidatively-functional monomer is selected from the group consisting of allyl methacrylate, vinyl methacrylate, acetoacetoxyethyl methacrylate, hydroxybutenyl methacrylate, an allyl ester of maleic acid, a diallyl ester of maleic acid, and poly(allyl glycidyl ether).

4. A latent oxidatively-functional-modified alkyd of claim 1, wherein at least one latent oxidatively-functional monomer is copolymerized with at least one ethylenically unsaturated co-monomer in the presence of said waterborne alkyd.

5. A latent oxidatively-functional-modified alkyd of claim 4, wherein said ethylenically unsaturated co-monomer is selected from the group consisting of styrene, α-methyl styrene, vinyl naphthalene, vinyl toluene, chloromethyl styrene, methyl acrylate, acrylic acid, methacrylic acid, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate, octyl acrylate, octyl methacrylate, glycidyl methacrylate, carbodiimide methacrylate, alkyl crotonates, vinyl acetate, di-n-butyl maleate, di-octylmaleate, t-butylaminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethyl acrylate, N-(2-methacryloyloxy-ethyl) ethylene urea, and methacrylamidoethylethylene urea.

6. A latent oxidatively-functional-modified alkyd of claim 5, wherein said ethylenically unsaturated co-monomer is selected from the group consisting of styrene, α-methyl styrene, vinyl naphthalene, vinyl toluene, and chloromethyl styrene.

7. A water-based latex comprising water and a latent oxidatively-functional-modified alkyd comprising the polymerization product of at least one latent oxidatively-functional monomer in the presence of an aqueous dispersion of a waterborne alkyd with the proviso that said waterborne alkyd does not contain a pendant sulfonate group, wherein said latent oxidatively-functional-modified alkyd of the latex possesses sufficient available latent oxidatively-functional groups to increase the effective oxidative crosslinking of said latent oxidatively-functional-modified alkyd upon application of the latex to a substrate.

8. A water-based latex of claim 7, wherein said latent oxidatively-functional-modified alkyd comprises about 5–60 wt % of a waterborne alkyd based on the total solids of the latex and about 40–95 wt % of the latent oxidatively-functional monomer based on the total solids of the latex.

9. A water-based latex of claim 7, further comprising a cosurfactant and wherein said waterborne alkyd comprises about 5–35 wt % of the total solids of the latex.

10. A water-based latex of claim 7, wherein said latent oxidatively-functional group is selected from the group consisting of allyl, vinyl, acetoacetyl, and enamine.

11. A water-based latex of claim 7, wherein said latent oxidatively-functional monomer is selected from the group consisting of allyl methacrylate, vinyl methacrylate, acetoacetoxyethyl methacrylate, hydroxybutenyl methacrylate, an allyl ester of maleic acid, a diallyl ester of maleic acid, and poly(allyl glycidyl ether).

12. A water-based latex of claim 7, wherein at least one latent oxidatively-functional monomer is copolymerized with at least one ethylenically unsaturated co-monomer in the presence of said waterborne alkyd.

13. A water-based latex of claim 12, wherein said ethylenically unsaturated co-monomer is selected from the group consisting of styrene, α-methyl styrene, vinyl naphthalene, vinyl toluene, chloromethyl styrene, methyl acrylate, acrylic acid, methacrylic acid, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate, octyl acrylate, octyl methacrylate, glycidyl methacrylate, carbodiimide methacrylate, alkyl crotonates, vinyl acetate, di-n-butyl maleate, di-octylmaleate, t-butylaminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethyl acrylate, N-(2-methacryloyloxy-ethyl) ethylene urea, and methacrylamidoethylethylene urea.

14. A coating composition comprising a water-based latex of claim 7 and at least one additive selected from the group consisting of rheology and flow control agents, extenders, reactive coalescing aids, plasticizers, flatting agents, pigment wetting and dispersing agents and surfactants, ultraviolet (UV) absorbers, UV light stabilizers, tinting pigments, colorants, defoaming and antifoaming agents, anti-settling, anti-sag and bodying agents, anti-skinning agents, anti-flooding and anti-floating agents, biocides, fungicides and mildewcides, corrosion inhibitors, thickening agents, and coalescing agents.

15. A method of preparing a water-based latex comprising the step of polymerizing at least one latent oxidatively-functional monomer in the presence of an aqueous dispersion of a waterborne alkyd with the proviso that said waterborne alkyd does not contain a pendant sulfonate group, wherein said polymerizing step is conducted under conditions sufficient for the survival of the latent oxidative functionality of said monomer such that the latent oxidatively-functional-modified alkyd of the resulting latex possesses sufficient available latent oxidatively-functional groups to increase the effective oxidative crosslinking of said latent oxidatively-functional-modified alkyd upon application of said latex to a substrate.

16. A method of claim 15, wherein said latent oxidatively-functional group is selected from the group consisting of allyl, vinyl, acetoacetyl, and enamine.

17. A method of claim 15, wherein said latent oxidatively-functional monomer is selected from the group consisting of allyl methacrylate, vinyl methacrylate, acetoacetoxyethyl methacrylate, hydroxybutenyl methacrylate, an allyl ester of maleic acid, a diallyl ester of maleic acid, and poly(allyl glycidyl ether).

18. A method of claim 15, wherein the polymerization is an emulsion polymerization.

19. A method of claim 15, wherein at least one latent oxidatively-functional monomer is copolymerized with at least one ethylenically unsaturated co-monomer in the presence of said waterborne alkyd.

* * * * *